No. 700,093. Patented May 13, 1902.
J. SEILER.
FISHING DEVICE.
(Application filed Sept. 30, 1901.)
(No Model.) 2 Sheets—Sheet 1.
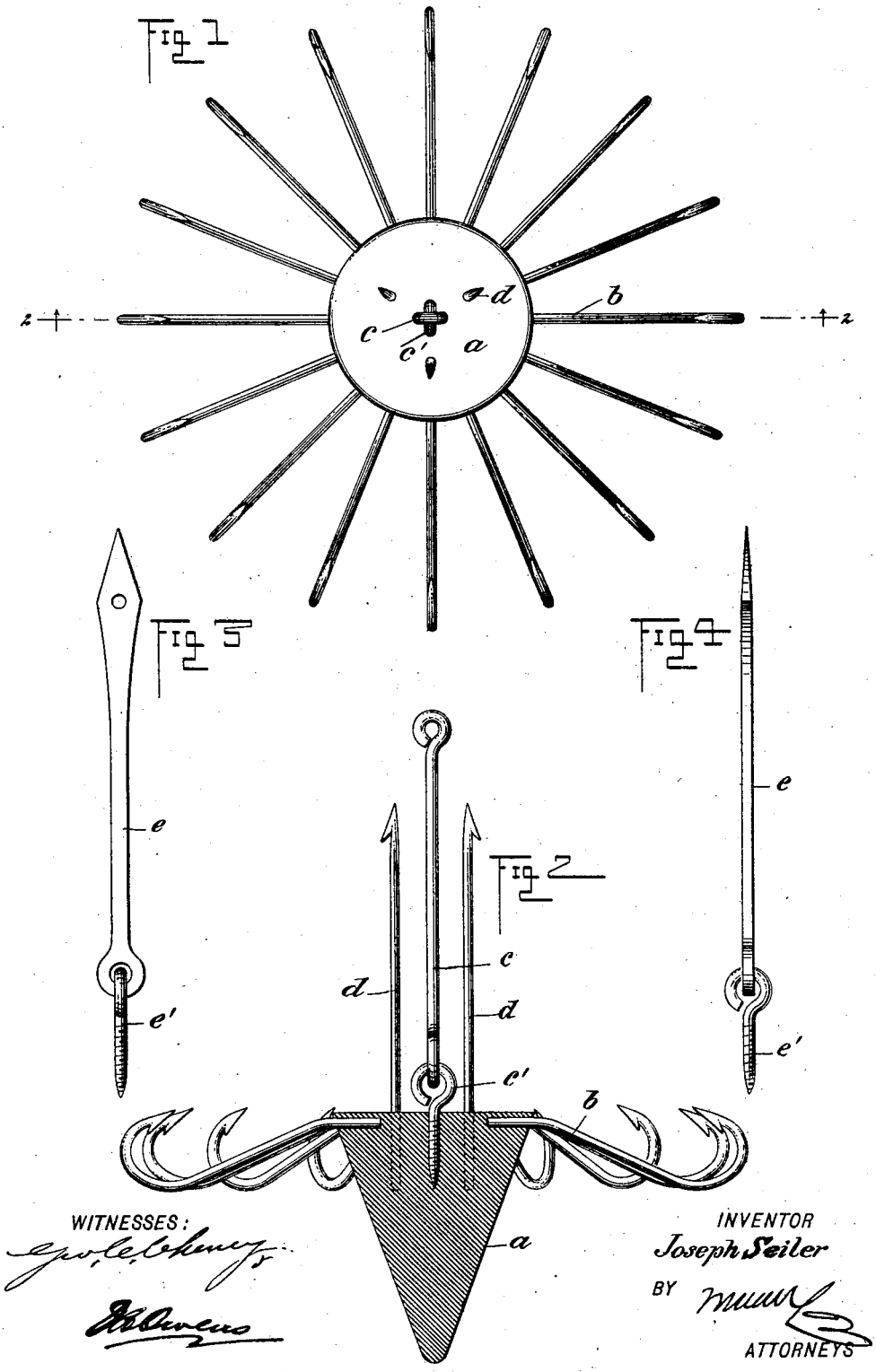
WITNESSES:
INVENTOR
Joseph Seiler
BY
ATTORNEYS No. 700,093. Patented May 13, 1902.
J. SEILER.
FISHING DEVICE.
(Application filed Sept. 30, 1901.)
(No Model.) 2 Sheets—Sheet 2.
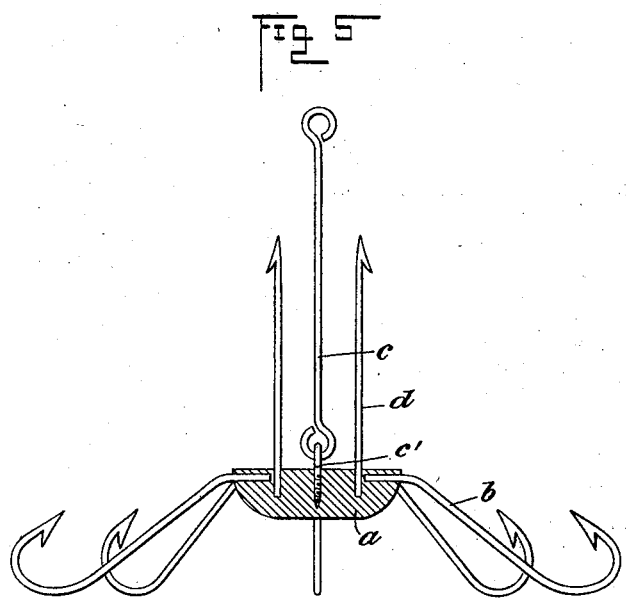
WITNESSES:
INVENTOR
Joseph Seiler
BY
ATTORNEYS

UNITED STATES PATENT OFFICE.

JOSEPH SEILER, OF SOUTH NORWALK, CONNECTICUT.

FISHING DEVICE.

SPECIFICATION forming part of Letters Patent No. 700,093, dated May 13, 1902.

Application filed September 30, 1901. Serial No. 77,086. (No model.)

*To all whom it may concern:*

Be it known that I, JOSEPH SEILER, a citizen of the United States, and a resident of South Norwalk, in the county of Fairfield and State of Connecticut, have invented a new and Improved Fishing Device, of which the following is a full, clear, and exact description.

This invention relates to a peculiar ganghook fishing device adapted either for bottom or surface fishing with bait of any sort.

This specification is a specific description of several forms of the invention, while the claims are definitions of the actual scope thereof.

Reference is to be had to the accompanying drawings, forming a part of this specification, in which similar characters of reference indicate corresponding parts in all the views.

Figure 1 is a plan view of a hook embodying my invention. Fig. 2 is a section on the line 2 2 of Fig. 1. Figs. 3 and 4 are views of modified forms of the shank, and Fig. 5 is a section of a modified form of the invention.

$a$ represents the body of the device, which for bottom fishing (see Figs. 1 and 2) should be comparatively heavy and for surface fishing (see Fig. 5) comparatively light. To this body are secured rigidly hooks $b$, projecting out radially and having their points upward, as shown.

In Figs. 1, 2, and 5, $c$ represents a stout wire shank, to which the line is attached, this shank having a screw $c'$ joined thereto by interengaging eyes and said screws being removably fastened into the body. When the shank $c$ is used, the bait is attached to spurs $d$, preferably three, as shown, and fitted removable yet friction-tight in the body $a$, the spurs projecting upward and being barbed to prevent the accidental dislodgment of the bait. The fish being attracted by the bait on the spurs $d$ in tugging thereon will warn the fisherman, who should hold the line, and then by a sharp pull on the line the fish will be impaled on the hooks $b$.

If desired, the shank $c$ may be removed, with its screw $c'$, from the body $a$ and replaced by a combined shank and spur $e$, having a screw $e'$, similar to the screw $c'$. This element $e$ has a pointed upper end and an eye thereon. The point permits bait to be impaled on the spur, and the eye facilitates the attachment of the line. When the shank and spur $e$ are used, the spurs $d$ should be dispensed with, the spurs $d$ being for worms and like small bait, while the spur and shank $e$ are for large bait, such as bivalves and the large classes of crustaceans. By pivoting the shank to the central part of the body of the device and rigidly attaching the hooks in the relative position shown the device is made to be thoroughly effective in action, and the capture of the fish is insured. When a fish takes the bait and the line is drawn up sharply, the hook which engages the fish is allowed to stand still relatively to the other part of the apparatus, the body portion then tilting relatively to the shank $c$ of the device. This enables the hook effectively to engage and impale the fish. Were the whole device to be drawn up as one rigid structure, the angle at which the line is pulled or the certain position which the device may have been caused by other influences to take would in many instances entirely defeat the capture of the fish.

Various changes in the form, proportions, and minor details may be resorted to without departing from the spirit and scope of my invention. Hence I consider myself entitled to all such variations as may lie within the scope of my claims.

Having thus described my invention, I claim as new and desire to secure by Letters Patent—

1. The combination of a body, means for attaching a line thereto, said means comprising a pointed spur with an eye therein, and hooks attached to the body and projecting outward therefrom with their points in direction of the line.

2. A fishing appliance, comprising a body, a shank fastened to the top of the body in the vertical center thereof, the shank serving to carry the fishing-line, hooks rigidly attached to the body and projecting outward radially therefrom, the hooks having their points extending in direction of the line, and a baitspur attached to the body and projecting upward therefrom alongside of the shank.

In testimony whereof I have signed my name to this specification in the presence of two subscribing witnesses.

JOSEPH SEILER.

Witnesses:
MATTHEW CORBETT,
FRANK D. LAWTON.